US012812295B2

(12) United States Patent
Xiao

(10) Patent No.: US 12,812,295 B2
(45) Date of Patent: Nov. 24, 2026

(54) PLAYING DEVICE, SOUND GENERATING DEVICE AND CONTROL APPARATUS THEREFOR

(71) Applicant: GOERTEK TECHNOLOGY CO., LTD., Qingdao (CN)

(72) Inventor: Binfeng Xiao, Qingdao (CN)

(73) Assignee: GOERTEK TECHNOLOGY CO., LTD, Qingdao (CN)

( * ) Notice: Subject to any disclaimer, the term of this patent is extended or adjusted under 35 U.S.C. 154(b) by 99 days.

(21) Appl. No.: 18/291,604

(22) PCT Filed: Jul. 12, 2022

(86) PCT No.: PCT/CN2022/105082

§ 371 (c)(1),
(2) Date: Jan. 24, 2024

(87) PCT Pub. No.: WO2023/005654

PCT Pub. Date: Feb. 2, 2023

(65) Prior Publication Data

US 2024/0284099 A1 Aug. 22, 2024

(30) Foreign Application Priority Data

Jul. 27, 2021 (CN) ......................... 202110849261.0

(51) Int. Cl.
*H04R 1/38* (2006.01)
*H04R 1/02* (2006.01)
(Continued)

(52) U.S. Cl.
CPC ............... *H04R 1/347* (2013.01); *H04R 1/02* (2013.01); *H04R 3/00* (2013.01); *H04R 2430/01* (2013.01); *H04R 2430/03* (2013.01)

(58) Field of Classification Search
CPC . H04R 1/347; H04R 1/02; H04R 1/38; H04R 3/00
(Continued)

(56) References Cited

U.S. PATENT DOCUMENTS 5,734,728 A * 3/1998 Meissner ............... H04R 1/347 381/345
2004/0264727 A1* 12/2004 Kim ....................... H04R 1/347 381/370
(Continued)

FOREIGN PATENT DOCUMENTS

CN 1585566 A 2/2005
CN 101208987 A 6/2008
(Continued)

OTHER PUBLICATIONS

International Search Report from International Application No. PCT/CN2022/105082 mailed Oct. 9, 2022.

*Primary Examiner* — George C Monikang
(74) *Attorney, Agent, or Firm* — Shih IP Law Group, PLLC

(57) ABSTRACT

Disclosed in the present disclosure is a sound generating device, a control apparatus thereof and a playing device, the sound generating device comprises: a housing provided with a front sound outlet communicated with a front cavity of a first loudspeaker and a rear sound outlet communicated with a rear cavity of the first loudspeaker and a front cavity of a second loudspeaker, a rear cavity of the second loudspeaker is enclosed, a phase of a sound signal output from the rear cavity of the first loudspeaker is opposite to that from the front cavity of the second loudspeaker, and is opposite to that from the front cavity of the first loudspeaker. The present disclosure can attenuate the sound radiation to the outside, weaken the attenuation of a far-field sound signal
(Continued)

and improve the sensitivity of a sound signal at the human ear.

19 Claims, 3 Drawing Sheets

(51) Int. Cl.
*H04R 1/34* (2006.01)
*H04R 3/00* (2006.01)

(58) Field of Classification Search
USPC ............ 381/59, 77, 80, 82, 85, 87, 89, 332, 381/334–335, 304
See application file for complete search history.

(56) References Cited

U.S. PATENT DOCUMENTS

| | | | | |
|---|---|---|---|---|
| 2006/0262948 | A1* | 11/2006 | Metcalf | H04R 5/02 381/300 |
| 2014/0126757 | A1 | 5/2014 | Davis | |
| 2019/0238971 | A1 | 8/2019 | Wakeland et al. | |
| 2021/0204058 | A1 | 7/2021 | Oishi et al. | |

FOREIGN PATENT DOCUMENTS

| | | | |
|---|---|---|---|
| CN | 206323548 | U | 7/2017 |
| CN | 209964287 | U | 1/2020 |
| CN | 210168201 | U | 3/2020 |
| CN | 110972029 | A | 4/2020 |
| CN | 111918167 | A | 11/2020 |
| CN | 112383655 | A | 2/2021 |
| CN | 113596639 | A | 11/2021 |
| JP | 2017210097 | A | 11/2017 |

* cited by examiner

PLAYING DEVICE, SOUND GENERATING DEVICE AND CONTROL APPARATUS THEREFOR

The present disclosure claims a priority to a Chinese Patent Application No. 202110849261.0, entitled "PLAYING DEVICE, SOUND GENERATING DEVICE AND CONTROL APPARATUS THEREFOR" filed with China Patent Office on Jul. 27, 2021, the entire contents of which are incorporated into the present disclosure by reference.

TECHNICAL FIELD

The present disclosure relates to a field of audio control, and more particularly, to a playing device, a sound generating device, and a control apparatus therefor.

DESCRIPTION OF RELATED ART

At present, a commonly used head mounted playing device plays a sound signal by a sound generating device mounted thereon. The sound generating device comprises a loudspeaker therein, and as shown in FIG. 1, a front surface of the loudspeaker is connected with a front sound outlet of the sound generating device, a back surface of the loudspeaker is connected with a rear sound outlet of the sound generating device, and the sound generating device radiates sound signals to outside by the front sound outlet and the rear sound outlet. Since a phase of the sound signal on the front surface of the loudspeaker is opposite to a phase of the sound signal on the back surface of the loudspeaker, a phase of the sound signal of the front sound outlet in the sound generating device is opposite to a phase of the sound signal of the rear sound outlet in the sound generating device. The distance from a receiving point to the front sound outlet in a horizontal direction is the same as the distance from the receiving point to the rear sound outlet in the horizontal direction, resulting in a significant attenuation of the sound signal received by the receiving point compared to that received in other directions, thereby achieving the purpose of attenuating the sound radiation to the outside. However, in a near-field, the signal heard by the human ear is also affected by the interference of the signals from the front sound outlet and the rear sound outlet, resulting in a decrease in the sensitivity at the human ear to medium and low frequency sound signals.

Therefore, how to provide a solution for solving the above-described technical problems is currently a problem that sought to be solved by those skilled in the art.

SUMMARY

A purpose of the present disclosure is to provide a playing device, a sound generating device and a control apparatus therefor, which can not only achieve a purpose of attenuating the sound radiation to the outside, but can also achieve a purpose of weakening the attenuation of a far-field sound signal, so that the sensitivity of the sound signal at the human ear is improved when the external environment is noisy.

In order to solve the above-described technical problems, the present disclosure provides a sound generating device comprising a housing, wherein the housing is provided with a front sound outlet and a rear sound outlet, an interior of the housing is provided with a first loudspeaker and a second loudspeaker, a front cavity of the first loudspeaker is communicated with the front sound outlet, a rear cavity of the first loudspeaker and a front cavity of the second loudspeaker are both communicated with the rear sound outlet, and a rear cavity of the second loudspeaker is enclosed, wherein, a phase of a sound signal output from the rear cavity of the first loudspeaker is opposite to a phase of a sound signal output from the front cavity of the second loudspeaker, and the phase of the sound signal output from the rear cavity of the first loudspeaker is opposite to a phase of a sound signal output from the front cavity of the first loudspeaker.

optionally, a plurality of second loudspeakers are provided.

In order to solve the above technical problems, the present disclosure also provides a control apparatus for a sound generating device as described in any one of the preceding items, and the control apparatus comprises:

a trigger module configured to generate a trigger signal if it is activated;

a control module configured to control an output of an audio signal, and also configured to generate a first control signal if the trigger signal is received and generate a second control signal if no trigger signal is received;

an adjustment module configured to control the first loudspeaker and the second loudspeaker in the sound generating device to output a sound signal based on the audio signal if the first control signal is received, and configured to control the first loudspeaker to output a sound signal based on the audio signal and control the second loudspeaker not to operate if the second control signal is received.

optionally, only one second loudspeaker is provided, and the adjustment module controls the first loudspeaker and the second loudspeaker in the sound generating device to output the sound signal based on the audio signal if the first control signal is received.

optionally, a plurality of second loudspeakers are provided, and the adjustment module controls the first loudspeaker and one or more of the second loudspeakers in the sound generating device to output the sound signal based on the audio signal if the first control signal is received.

Optionally, the trigger module is one or more of a pressure sensor, a toggle switch and a noise sensor.

Optionally, the adjustment module comprises:

a filtering compensation module configured to adjust a gain value and a phase value of each frequency band of the audio signal;

a first power amplification module connected to the first loudspeaker, wherein the first power amplification module is configured to adjust the gain value of each frequency band of the audio signal according to the received first control signal or the received second control signal, so that the first loudspeaker outputs a first sound signal or a second sound signal; and a second power amplification module connected to the second loudspeaker, wherein the second power amplification module is configured to adjust the gain value of each frequency band of the audio signal, so that the second loudspeaker outputs a third sound signal.

Optionally, the adjustment module further comprises:

a first switch, provided between the first power amplification module and a power supply module, and configured to turned on if the first control signal or the second control signal is received; and a second switch, provided between the second power amplification module and the power module, and configured to turned on if the first control signal is received and turned off if no first control signal is received.

Optionally, the filtering compensation module is a DSP.

In order to solve the above-described technical problems, the present application also provides a playing device, comprising:

the sound generating device as described in any one of the preceding items;

the control apparatus for the sound generating device as described in any one of the preceding items.

The present disclosure provides a sound generating device comprising two loudspeakers, wherein a rear cavity of a first loudspeaker is communicated with a front cavity of a second loudspeaker and they are coupled at a rear sound outlet of the sound generating device. When only the first loudspeaker operates, the sound signals output from the front sound outlet and the rear sound outlet of the sound generating device have similar amplitudes and opposite phases, and in a horizontal direction, there is a significant attenuation effect for the far-field, to achieve the purpose of attenuating the sound radiation to the outside. When both of the first loudspeaker and the second loudspeaker operate, since a sound signal output from the second loudspeaker and a sound signal output from the rear cavity of the first loudspeaker have opposite phases and similar amplitudes, the sound signal output from the rear sound outlet of the sound generating device is attenuated, thereby reducing the influence on the intensity of the sound signal radiated from the front sound outlet, and significantly weakening the attenuation of the far-field sound signal, and when the external environmental noise is large, the sensitivity of the sound signal at the human ear is improved. The present disclosure also provides a control apparatus for sound generating device and a playing device, which have beneficial effects the same as that of the above-described sound generating device.

BRIEF DESCRIPTION OF DRAWINGS

The drawings herein are incorporated into the specification and constitute a part of the present specification, illustrate embodiments in accordance with the present disclosure and used to explain the principles of the present disclosure together with the specification.

In order to more clearly illustrate the technical solutions in the embodiments of the present disclosure or in the prior art, the drawings required to be used for the content of the embodiments or the prior art will be briefly introduced in the following. Obviously, for those of ordinary skill in the art, other drawings can also be obtained from the provided drawings without any creative effort.

The implementation, functional characteristics, and advantages of the purpose of the present disclosure will be further explained in conjunction with the embodiments, with reference to the drawings.

DETAILED DESCRIPTIONS

A main purpose of the present disclosure is to provide a playing device, a sound generating device and a control apparatus therefor, which can not only achieve a purpose of attenuating the sound radiation to the outside, but can also achieve a purpose of weakening the attenuation of a far-field sound signal, so that the sensitivity to the sound signals at the human ear is improved when the external environment is noisy.

In order to make the purpose, the technical solution, and the advantages of the present embodiments clearer, the following will provide a clear and complete description of the technical solution in the present embodiments in conjunction with the drawings. Obviously, the described embodiment is a part of the present embodiment, not the entire embodiment. Based on the embodiments in the present disclosure, all other embodiments obtained by those skilled in the art without creative labor fall within the protection scope of the present disclosure.

Figure 1:
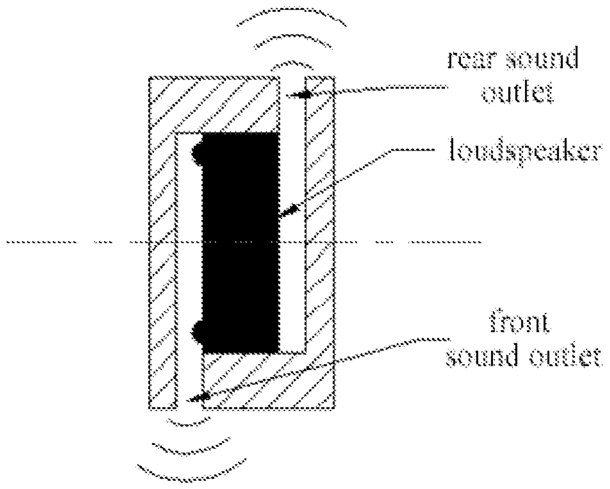
FIG. 1 is a schematic diagram of a structure of a sound generating device in the prior art.
Figure 2:
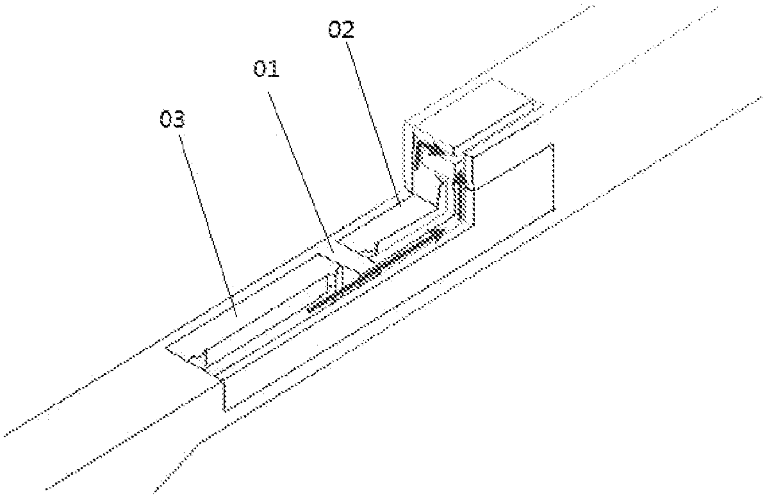
FIG. 2 is a schematic diagram of a structure of a sound generating device provided in the present disclosure.
Figure 3:
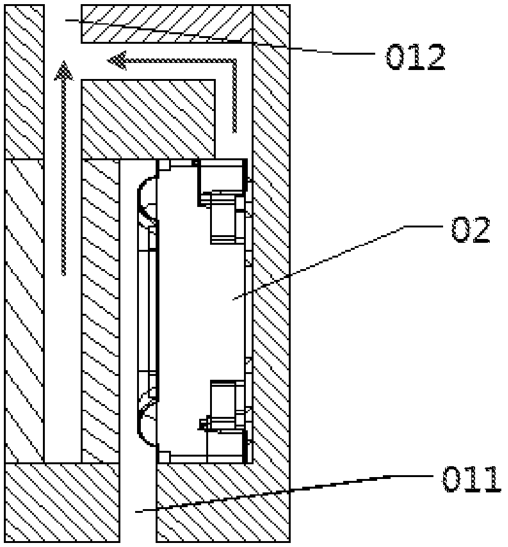
FIG. 3 is a schematic diagram of a structure of another sound generating device provided in the present disclosure.

Please refer to FIGS. 2 and 3, each of which is a schematic diagram of a structure of a sound generating device provided in the present disclosure. The sound generating device comprises a housing 01, wherein the housing 01 is provided with a front sound outlet 011 and a rear sound outlet 012, an interior of the housing 01 is provided with a first loudspeaker 02 and a second loudspeaker 03, a front cavity of the first loudspeaker 02 is communicated with the front sound outlet 011, a rear cavity of the first loudspeaker 02 and a front cavity of the second loudspeaker 03 are both communicated with the rear sound outlet 012, and a rear cavity of the second loudspeaker 03 is enclosed.

Wherein, a phase of a sound signal output from the rear cavity of the first loudspeaker 02 is opposite to a phase of a sound signal output from the front cavity of the second loudspeaker 03, and the phase of the sound signal output from the rear cavity of the first loudspeaker 02 is opposite to a phase of a sound signal output from the front cavity of the first loudspeaker 02.

As shown in FIG. 2, the housing 01 of the sound generating device is provided with the front sound outlet 011 and the rear sound outlet 012 which are arranged opposite to each other, and the front sound outlet 011 is a sound outlet of the sound generating device adjacent to the human ear. The sound generating device radiates sound signals to outside by the front sound outlet 011 and the rear sound outlet 012. It can be understood that, the sound signal radiated from the front sound outlet 011 and the sound signal radiated from the rear sound outlet 012 are superimposed in the air and then reach the receiving point. In the present disclosure, the sound generating device comprises the first loudspeaker 02 and the second loudspeaker 03, and both of the first loudspeaker 02 and the second loudspeaker 03 are provided inside the housing 01 of the sound generating device.

It can be understood that, the sound signal output from the front cavity of the loudspeaker and the sound signal output from the rear cavity of the loudspeaker are superimposed, so that a certain sound signal can be received at the human ear, wherein the sound signal received by the receiving point at the far-field has more attenuation, and in the meanwhile, in order to ensure that the sound signal received at the human ear is not attenuated in a very noisy environment, the first loudspeaker 02, the second loudspeaker 03 and the housing 01 in the sound generating device of the present disclosure may adopt the following structure, that is, the front cavity of the first loudspeaker 02 and the front sound outlet 011 of the housing 01 are communicated, the rear cavity of the first loudspeaker 02 and the front cavity of the second loudspeaker 03 are communicated and they are coupled at the rear sound outlet 012 of the housing 01, and the rear cavity of the second loudspeaker 03 is enclosed.

On the basis of the above structure, when the first loudspeaker 02 operates and the second loudspeaker 03 does not operate, the sound generating device only outputs the sound signal by the first loudspeaker 02. Since the sound signal output from the front cavity of the first loudspeaker 02 and the sound signal output from the rear cavity of the first loudspeaker 02 have similar amplitudes and opposite phases, the sound signal radiated from the front sound outlet 011 of the housing 01 and the sound signal radiated from the rear sound outlet 012 of the housing 01 are also have similar amplitudes and opposite phases. In the horizontal direction, there is a significant signal attenuation effect in the far-field, to achieve the purpose of attenuating the sound radiation to the outside. When both of the first loudspeaker 02 and the second loudspeaker 03 operate, that is, the sound generating device simultaneously outputs sound signals by the first loudspeaker 02 and the second loudspeaker 03, since the rear cavity of the first loudspeaker 02 and the front cavity of the second loudspeaker 03 are communicated and they are coupled at the rear sound outlet 012 of the housing 01, and since the sound signal output from the rear cavity of the first loudspeaker 02 and the sound signal output from the front cavity of the second loudspeaker 03 have opposite phases, the sound signal at the rear sound outlet 012 of the housing 01 is attenuated. Therefore, the amplitude of the sound signal at the rear sound outlet 012 of the housing 01 and the amplitude of the sound signal at the front sound outlet 011 of the housing 01 are no longer similar, thereby reducing the influence on the sound signal at the front sound outlet 011, thereby significantly weakening the attenuation of the sound signal at the far-field, in the meanwhile, the sound loudness at the human ear at the near-field may increase, thereby improving the sensitivity of the sound signal at the human ear and controlling the directionality of the far-field sound signal.

As an optional embodiment, at least one second loudspeaker 03 is provided.

Specifically, one second loudspeaker 03 may be provided or a plurality of second loudspeakers 03 may be provided, only ensuring that the front cavity of the second loudspeaker 03 and the rear cavity of the first loudspeaker 02 are communicated and they are coupled at the rear sound outlet 012 of the housing 01. In the present disclosure, the number of the second loudspeakers 03 and the relative position arrangements of the second loudspeakers 03 within the housing 01 are not limited specifically.

It can be seen that, in this embodiment, the sound generating device comprises two loudspeakers, among them, the rear cavity of the first loudspeaker 02 and the front cavity of the second loudspeaker 03 are communicated and they are coupled at the rear sound outlet 012 of the sound generating device, and when only the first loudspeaker 02 operates, the sound signals output from the front sound outlet 011 and the rear sound outlet 012 of the sound generating device have similar amplitudes and opposite phases, and in the horizontal direction, there is a significant attenuation effect for the far-field, to achieve the purpose of attenuating the sound radiation to the outside. When both of the first loudspeaker and the second loudspeaker operate, since the sound signal output from the second loudspeaker 03 and the sound signal output from the rear cavity of the first loudspeaker 02 have similar amplitudes and opposite phases, the sound signal output from the rear sound outlet 012 of the sound generating device is attenuated, thereby reducing the influence on the intensity of the sound signal radiated from the front sound outlet 011, and significantly weakening the attenuation of the sound signal, and when the external environmental noise is large, the sensitivity of the sound signals at the human ear is improved.

Figure 4:
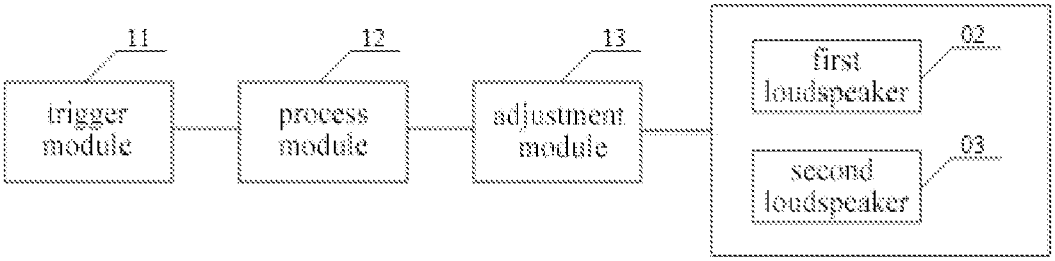
FIG. 4 is a schematic diagram of a structure of a control apparatus for a sound generating device provided in the present disclosure.

Please refer to FIG. 4, FIG. 4 is a schematic diagram of a structure of a control apparatus for a sound generating device provided in the present disclosure, and the sound generating device is the sound generating device described in any one of the above embodiments, and the sound generating device comprises a housing, and the housing is provided with a front sound outlet and a rear sound outlet, an interior of the housing is provided with a first loudspeaker 02 and a second loudspeaker 03, a front cavity of the first loudspeaker 02 is communicated with the front sound outlet, a rear cavity of the first loudspeaker 02 and a front cavity of the second loudspeaker 03 are both communicated with the rear sound outlet, and a rear cavity of the second loudspeaker 03 is enclosed.

The control apparatus comprises:

- a trigger module 11 for generating a trigger signal if it is activated;
- a control module 12 for controlling an output of an audio signal, and also for generating a first control signal if the trigger signal is received and generating a second control signal if no trigger signal is received; and
- an adjustment module 13 for controlling the first loudspeaker 02 and the second loudspeaker 03 in the sound generating device to output a sound signal based on the audio signal if the first control signal is received, and controlling the first loudspeaker 02 to output a sound signal based on the audio signal and controlling the second loudspeaker 03 not to operate if the second control signal is received.

Specifically, the control apparatus provided in this embodiment comprises the trigger module 11, the control module 12, and the adjustment module 13, wherein the trigger module 11 may be manually activated by the user or may be automatically activated according to preset conditions. If the trigger module 11 is activated, it may be considered that the attenuation of the sound signal at the near-field (i.e. at the human ear) is required to be weakened. Therefore, the control module 12 may select the loudspeaker that is required to operate in the sound generating device according to whether the trigger signal is received, for example, the first loudspeaker 02 operates alone or the first loudspeaker 02 and the second loudspeaker 03 operate together. For convenient of description, a mode that the first loudspeaker 02 and the second loudspeaker 03 are required to operate together is called "Mode 1", and a mode that the first loudspeaker 02 is required to operate alone is called "Mode 2", among them, when one second loudspeaker 03 is provided, the Mode 1 means that the first loudspeaker 02 and one second loudspeaker 03 operate together; when a plurality of second loudspeakers 03 are provided, the Mode 1 means selecting the first loudspeaker 02 and one or more of the second loudspeakers 03 to operate together according to the user's requirements.

Specifically, the control module 12 is used to control an output of the audio signal and generates a corresponding control signal according to whether the trigger signal is received. If the trigger signal is received, a first control signal is generated; if no trigger signal is received, a second control signal is generated. The control module 12 may be implemented by using MCU (Microcontroller Unit) or SOC (System on Chip), of course, it also can be implemented by other devices that can achieve the same functions. This embodiment is not specifically limited herein.

Specifically, if the first control signal is received, the adjustment module 13 allows the control module 12 to control the phase and the gain of the output audio signal to be adjusted correspondingly, and to control the first loudspeaker 02 and the second loudspeaker 03 to output the sound signals based on the audio signal, respectively. At this point, when one second loudspeaker 03 is provided, the first loudspeaker 02 and the second loudspeaker 03 operate simultaneously. When a plurality of second loudspeakers 03 are provided, the first loudspeaker 02 and one or more second loudspeakers 03 are controlled to operate together according to the user's requirements. Since the sound signal output from the front cavity of the second loudspeaker 03 and the sound signal output from the rear cavity of the first loudspeaker 02 have similar amplitudes and opposite phases, the sound signal output from the rear sound outlet of the sound generating device is attenuated. Specifically, when a plurality of second loudspeakers 03 are provided, if the external environmental noise is large, the first loudspeaker 02 and a larger number of second loudspeakers 03 are selected to operate together, at this time, the sound signal from the rear sound outlet has a relatively smaller influence on the intensity of the sound signal radiated from the front sound outlet. If the external environment noise is small, the first loudspeaker 02 and a smaller number of second loudspeakers 03 are selected to operate together, at this time, the sound signal from the rear sound outlet has a relatively greater influence on the intensity of the sound signal radiated from the front sound outlet. Therefore, according to the different external environments, the sound signal from the rear sound outlet has different degrees of influence on the weakening of the intensity of the sound signal radiated from the front sound outlet, which reduces the noise reduction effect in the far-field horizontal direction and increases the loudness of the sound received at the human ear at the near-field, thereby achieving the object of improving the signal sensitivity at the human ear.

Specifically, if a second control signal is received, the adjustment module 13 allows the control module 12 to control the phase and the gain of the output audio signal to be adjusted correspondingly, and to control the first loudspeaker 02 to output the sound signals based on the audio signal, and to control the second loudspeaker 03 to not operate. At this time, since only the first loudspeaker 02 operates in the sound generating device, the sound signals radiated to outside from the front sound outlet and the rear sound outlet of the housing of the sound generating device are the sound signal output by the front cavity of the first loudspeaker 02 and the sound signal output by the rear cavity of the first loudspeaker 02, respectively. At this time, the maximum output of the sound signal is relatively small due to the sound short circuit phenomenon of the front sound outlet and the rear sound outlet of the sound generating device, there is a sound attenuation effect in the far-field horizontal direction and has a good privacy.

As an optional embodiment, the trigger module 11 is one or more of a pressure sensor, a toggle switch and a noise sensor.

If the pressure sensor is used as the trigger module 11 in this embodiment, whether the trigger module 11 is activated may be determined according to the user's pressuring level, i.e. a magnitude of a pressure value collected by a pressure sensor. When the pressure value is greater than or equal to the preset pressure value, the trigger module 11 is activated, and the triggering signal is generated. When an audio signal is required to be output, the control module 12 controls the sound generating device to operate according to the Mode 1, and when one second loudspeaker 03 is provided, the control module 12 controls the first loudspeaker 02 and the second loudspeaker 03 to operate, and when a plurality of second loudspeakers 03 are provided, the control module 12 sets different pressure levels according to the magnitude of the pressure value, and controls the first loudspeaker 02 and the corresponding number of second loudspeakers 03 to operate according to different pressure levels; and when the pressure value is less than the preset pressure value or there is no pressure value, the trigger module 11 is not activated and no trigger signal is generated, and when an audio signal is required to be output, the control module 12 controls the sound generating device to operate according to the Mode 2.

If a toggle switch is used as the trigger module 11 in this embodiment, whether the trigger module 11 is activated may be determined according to the position signal of the toggle switch. When the position signal of the toggle switch corresponds to a first position, the trigger module 11 is activated to generate a triggering signal. When an audio signal is required to be output, the control module 12 controls the sound generating device to operate according to the Mode 1, and when one second loudspeaker 03 is provided, the control module 12 controls the first loudspeaker 02 and the second loudspeaker 03 to operate, and when a plurality of second loudspeakers 03 are provided, the control module 12 sets different triggering signals according to different positions of the toggle switch, and controls the first loudspeaker 02 and the corresponding number of second loudspeakers 03 to operate according to different triggering signals; and when the position signal of the toggle switch corresponds to the second position, the trigger module 11 is not activated and the triggering signal is not generated, and when an audio signal is required to be output, the control module 12 controls the sound generating device to operate according to the Mode 2.

If a noise sensor is used as the trigger module 11 in this embodiment, whether the trigger module 11 is activated may be determined based on a noise value of the environment in which the sound generating device is located. When the noise value is greater than or equal to a preset noise value, the trigger module 11 is activated to generate a triggering signal. When an audio signal is required to be output, the control module 12 controls the sound generating device to operate according to the Mode 1. When one second loudspeaker 03 is provided, the control module 12 controls the first loudspeaker 02 and the second loudspeaker 03 to operate, and when a plurality of second loudspeakers 03 are provided, the control module 12 sets different noise levels according to a magnitude of the noise value, and controls the first loudspeaker 02 and the corresponding number of second loudspeakers 03 to operate according to different noise levels. For example, when three second loudspeakers are provided, in the case where the noise value is greater than 60 decibels, the trigger module 11 is activated to generate a trigger signal, and in the case where the noise value is between 60-70 decibels, a first trigger signal is generated to control the first loudspeaker 02 and one second loudspeaker 03 to operate, and in the case where the noise value is between 70-80 decibels, a second trigger signal is generated to control the first loudspeaker 02 and two second loudspeakers 03 to operate, and in the case where the noise value is greater than 80 decibels, a third trigger signal is generated to control the first loudspeaker 02 and three second loudspeakers 03 to operate; and when the noise value is less than the preset noise value, the trigger module 11 is not activated and the trigger signal is not generated, and when an audio signal is required to be output, the control module 12 controls the sound generating device to operate according to the Mode 2. As an optional embodiment, noise may be collected by the existing microphone in the playing device to reduce hardware costs.

Of course, the trigger module 11 and the control module 12 may be implemented not only by the above-described devices, but may also by other devices only ensuring to achieve the same functions. This embodiment will not be specifically limited herein.

As an optional embodiment, the adjustment module 13 comprises:

a filtering compensation module 131 for adjusting a gain value and a phase value of each frequency band of the audio signal;

a first power amplification module 132 connected with the first loudspeaker 02, wherein the first power amplification module 132 is used to adjust the gain value of each frequency band of the audio signal according to the received first control signal or the received second control signal, so that the first loudspeaker 02 outputs the first sound signal or the second sound signal; and a second power amplification module 133 connected with the second loudspeaker 03, wherein the second power amplification module 133 is used to adjust the gain value of each frequency band of the audio signal, so that the second loudspeaker 03 outputs a third sound signal.

Specifically, the number of the second power amplification modules 133 is the same as the number of the second loudspeaker 03. When one second loudspeaker 03 is provided, the adjustment module 13 comprises one second power amplification module 133, and when a plurality of second loudspeakers 03 are provided, the adjustment module 13 comprises a plurality of second power amplification modules 133, and each power amplification module 133 is connected to each of the plurality of second loudspeakers 03 in one-to-one correspondence relationship. When the sound generating device operates in the Mode 1 and the Mode 2, the filtering compensation module 131 and the power amplification module correspond to different configuration parameters, respectively. Under different configuration parameters, the first loudspeaker 02 and the second loudspeaker 03 may output different sound signals based on the audio signal. When it is required to control the sound generating device to operate in the Mode 1, the filter configuration parameters and the PA gain configuration parameters of the Mode 1 are selected to configure the filtering compensation module 131, the first power amplification module 132, and each of the second power amplification modules 133. When it is required to control the sound generating device to operate in the Mode 2, the filter configuration parameters and the PA gain configuration parameters of the Mode 2 are selected to configure the filtering compensation module 131 and the first power amplification module 132, wherein the filter configuration parameter comprises the gain value and the phase value for each frequency band. It can be understood that, the first power amplification module 132 has two sets of PA gain configuration parameters, one set of PA gain configuration parameters is applied to the Mode 1, and the other set of PA gain configuration parameters is applied to the Mode 2, and each of the second power amplification modules 133 has one set of PA gain configuration parameters applied to the Mode 1.

For convenient of understanding, the following content will explain the control process of the present disclosure simply by taking that the sound generating device comprises one second loudspeaker 03 and the adjustment module 13 comprises one second power amplification module 133 as an example. When the sound generating device comprises a plurality of second loudspeakers 03 and the adjustment module 13 comprises a plurality of second power amplification modules 133, after the second loudspeaker 03 that is required to operate is determined according to the user's requirements, the control process for each second loudspeaker 03 is the same.

Figure 5:
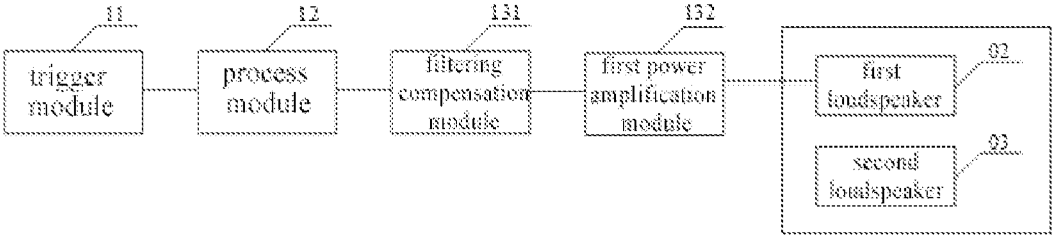
FIG. 5 is a schematic diagram of a structure of a control apparatus for another sound generating device provided in the present disclosure.

Specifically, if the trigger module 11 is not activated, the sound generating device is controlled to operate in the Mode 2. Referring to the control logic shown in FIG. 5, the control module 12 sends a second control signal, and the second control signal controls the filtering compensation module 131 to select the filter configuration parameters of the Mode 2, and controls the first power amplification module 132 to select the PA gain configuration parameters of the Mode 2, and the filtering compensation module 131 adjusts the audio signal output from the control module 12 by the filter configuration parameters of the Mode 2. Correspondingly, the first power amplification module 132 continues to adjust the audio signal adjusted by the filtering compensation module 131, by the PA gain configuration parameters of the Mode 2, and then outputs it by the first loudspeaker 02. Since only the first loudspeaker 02 operates in the sound generating device at this time, the sound signals output by the front sound outlet and the rear sound outlet of the sound generating device are the sound signals output by the front cavity of the first loudspeaker 02 and the rear cavity of the first loudspeaker 02, respectively, and the sound signals output by the front cavity and the rear cavity of the first loudspeaker 02 have similar amplitudes and opposite phases, therefore, in the Mode 2, a maximum output of the sound signal is relatively small due to the sound short circuit phenomenon of the front sound outlet and the rear sound outlet, but there is a sound attenuation effect in the far-field horizontal direction and has a good privacy.

Figure 6:
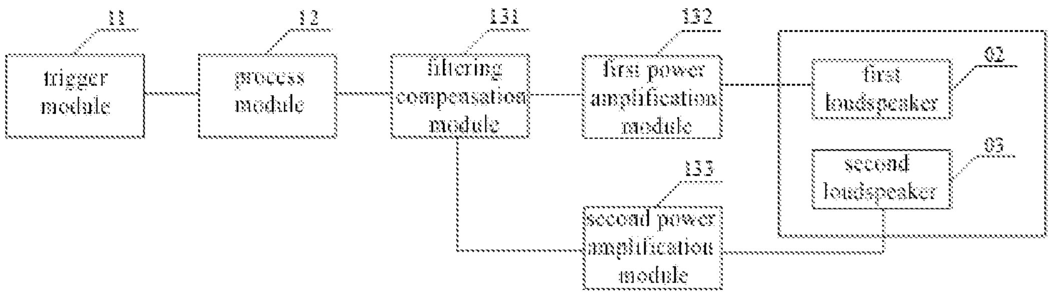
FIG. 6 is a schematic diagram of the structure of a control apparatus for further another sound generating device provided in the present disclosure.

Specifically, if the trigger module 11 is activated, the sound generating device is controlled to be operate in the Mode 1. Referring to the control logic shown in FIG. 6, the control module 12 sends a first control signal, and the first control signal controls the filtering compensation module 131 to select the filter configuration parameters of the Mode 1, and controls the first power amplification module 132 to select the PA gain configuration parameters of the Mode 1, and in the meanwhile, controls the second power amplification module 133 to start to operate. At this time, since the second loudspeaker 03 also starts to operate, the sound signal output from the rear sound outlet of the first loudspeaker 02 is attenuated, which reduces the influence of the sound signal from the rear sound outlet on the intensity of the sound signal radiated from the front sound outlet, and reduces the noise reduction effect in the far-field horizontal direction, and increases the loudness of the sound r received at the human ear at the near-field, thereby achieving the object of improving the signal sensitivity at the human ear when the external noise is high.

When the sound generating device switches to the Mode 1 to operate, the loudness of the sound received at the human ear may increase. Considering this situation, in order to avoid the adverse experience brought to the user caused by the sudden increase in loudness, the PA gain parameter of the first power amplification module in the Mode 1 may be set to be smaller than the PA gain parameter of the first power amplification module in the Mode 2. Specifically, the PA gain value in the Mode 1 may be smaller than that in the Mode 2 by 7 dB.

It can be understood that, if the PA gain parameter of the first power amplification module is selected to have the same gain value in the Mode 1 and the Mode 2, the sound generating device may have a larger sound signal output in the Mode 1, therefore the maximum sound output in the Mode 1 may be larger than that in the Mode 2. Therefore, the Mode 1 is suitable for use in noisy environments that do not require privacy and have high requirements for the magnitude of the output signal. In summary, the present disclosure may be used to change the operating mode of the sound generating device under different requirements, control the sound radiation to the outside, and control an upper limit of the sound signal output, so that having minimal influence on bandwidth.

As an optional embodiment, when a plurality of second loudspeakers 03 are provided, each second power amplification module 133 may select the same PA gain configuration parameter or different PA gain configuration parameters. When each second power amplification module 133 selects the same PA gain configuration parameter, the corresponding number of second loudspeakers 03 may be directly selected to operate according to user's requirements in the subsequent process, so that one or more of the second loudspeakers 03 output sound signals that meet the user's requirements. For example, the larger the noise value, the more second loudspeakers 03 may be selected to operate simultaneously. When each second power amplification module 133 selects different PA gain configuration parameters, the second power amplification module 133 with the corresponding PA gain configuration parameters may be selected to operate according to user's requirements in the subsequent process. For example, the magnitude of the sound signal that is required to be output by the second loudspeaker 03 is determined according to the current noise level, so as to select the second power amplification module 133 with the corresponding PA gain configuration parameter to operate, so that one or more of the second loudspeakers 03 output the sound signals that meet the user's requirements.

As an optional embodiment, the adjustment module 13 further comprises:

a first switch, provided between the first power amplification module 132 and the power module, and used to turned on if the first control signal or the second control signal is received; and a second switch provided between the second power amplification module 133 and the power module, and used to turned on if the first control signal is received and turned off if no first control signal is received.

Specifically, the first switch is further provided between the power supply module and the power supply end of the first power amplification module 132. Correspondingly, the second switch is further provided between the power supply module and the power supply end of each of the second power amplification modules 133. The control module 12 may control whether the first power amplification module 132 and the second power amplification module 133 are required to operate by controlling turning on or turning off of the first switch and the second switch. It can be understood that, when the second power amplification module 133 not operate, no signal is transmitted to the second loudspeaker 03, and at this time, the second loudspeaker 03 does not operate. The state of the power amplification module is controlled by cutting off or conducting the power supply path, thereby improving the control accuracy and the reliability.

As an optional embodiment, the filtering compensation module 131 is a DSP.

Specifically, the filtering compensation module 131 may be implemented by DSP or implemented by analog circuits, only achieving the purpose of adjusting the gain magnitude and the phase of each frequency band. The present disclosure is not specifically limited herein.

Figure 7:
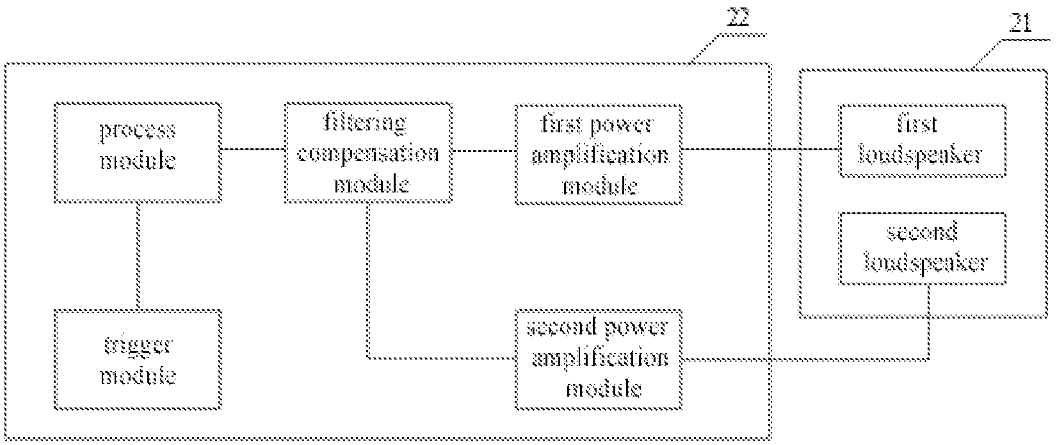
FIG. 7 is a schematic diagram of a structure of a playing device provided in the present disclosure.

Please refer to FIG. 7, FIG. 7 is a schematic diagram of a structure of a playing device provided in the present disclosure, the playing device comprises:

the sound generating device 21 as described in any one of the embodiments described in the above; and a control apparatus 22 of the sound generating device 21 as described in any one of the embodiments described in the above.

Specifically, the present disclosure may be applied to all head-mounted or ear-mounted playing devices, such as smart glasses, AR/Bluetooth headphones, and all sound playing devices used in the scenario of in the human ear.

For the introduction of the playing device provided in the present disclosure, please refer to the above embodiments, and this disclosure will not be repeated herein.

The playing device provided in the present disclosure has the same beneficial effect as the sound generating device 21 and the control apparatus 22 as described in the above.

It should be noted that, in the description, relational terms such as first and second described herein are only used to distinguish one entity or operation from another entity or operation, and do not necessarily require or imply any such actual relationship or order between these entities or operations. Moreover, terms such as "include", "comprise" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "including a . . . " does not preclude the presence of additional identical elements in the process, method, article or apparatus including the element.

The above explanation of the disclosed embodiments enables those skilled in the art to implement or use this disclosure. The various modifications to these embodiments will be apparent to those skilled in the art, and the general principles defined in this disclosure can be implemented in other embodiments without departing from the spirit or scope of the present disclosure. Therefore, this disclosure will not be limited to the embodiments shown herein, but rather have the widest scope consistent with the principles and novel features disclosed herein.

The above are only preferred embodiments of the present disclosure and are not intended to limit the patent scope of the present disclosure. Any equivalent structure or equivalent process changes made using the description and drawings of the present disclosure, or directly or indirectly applied in other related technical fields, are equally included in the scope of patent protection of this disclosure.

What is claimed is:

1. A sound generating device, comprising:

a housing, wherein the housing is provided with a front sound outlet and a rear sound outlet, an interior of the housing is provided with a first loudspeaker and a second loudspeaker, a front cavity of the first loudspeaker is communicated with the front sound outlet, a rear cavity of the first loudspeaker and a front cavity of the second loudspeaker are both communicated with the rear sound outlet, and a rear cavity of the second loudspeaker is enclosed, wherein, a phase of a sound signal output from the rear cavity of the first loud speaker is opposite to a phase of a sound signal output from the front cavity of the second loudspeaker, and the phase of the sound signal output from the rear cavity of the first loudspeaker is opposite to a phase of a sound signal output from the front cavity of the first loudspeaker, and wherein the sound generating device is applied to all head-mounted or ear-mounted playing devices, and the front sound outlet is a sound outlet of the sound generating device adjacent to a human ear.

2. The sound generating device of claim 1, wherein a plurality of second loudspeakers are provided.

3. A control apparatus for a sound generating device according to claim 1, and the control apparatus comprises:

a trigger module configured to generate a trigger signal if it is activated;

a control module configured to control an output of an audio signal, and also configured to generate a first control signal if the trigger signal is received and generate a second control signal if no trigger signal is received;

an adjustment module configured to control the first loudspeaker and the second loudspeaker in the sound generating device to output a sound signal based on the audio signal if the first control signal is received, and configured to control the first loudspeaker to output a sound signal based on the audio signal and control the second loudspeaker not to operate if the second control signal is received.

4. The control apparatus of claim 3, wherein only one second loudspeaker is provided, and the adjustment module controls the first loudspeaker and the second loudspeaker in the sound generating device to output the sound signal based on the audio signal if the first control signal is received.

5. The control apparatus of claim 3, wherein a plurality of second loudspeakers are provided, and the adjustment module controls the first loudspeaker and one or more of the second loudspeakers in the sound generating device to output the sound signal based on the audio signal if the first control signal is received.

6. The control apparatus of claim 3, wherein the trigger module is one or more of a pressure sensor, a toggle switch and a noise sensor.

7. The control apparatus of claim 3, wherein the adjustment module comprises:

a filtering compensation module configured to adjust a gain value and a phase value of each frequency band of the audio signal;

a first power amplification module connected with the first loudspeaker, where in the first power amplification module is configured to adjust the gain value of each frequency band of the audio signal according to the received first control signal or the received second control signal, so that the first loudspeaker outputs a first sound sign al or a second sound signal; and a second power amplification module connected with the second loudspeaker, wherein the second power amplification module is configured to adjust the gain value of each frequency band of the audio signal, so that the second loudspeaker outputs a third sound signal.

8. The control apparatus of claim 5, wherein the adjustment module further comprises:

a first switch provided between the first power amplification module and a power supply module, and configured to turned on if the first control signal or the second control signal is received; and a second switch provided between the second power amplification module and the power module, and configured to turned on if the first control signal is received and turned off if no first control signal is received.

9. The control apparatus of claim 7, wherein the filtering compensation module is a DSP.

10. A playing device, comprising:

a sound generating device according to claim 1; and a control apparatus for the sound generating device, wherein the control apparatus comprises:

a trigger module configured to generate a trigger signal if it is activated;

a control module configured to control an output of an audio signal, and also configured to generate a first control signal if the trigger signal is received and generate a second control signal if no trigger signal is received;

an adjustment module configured to control the first loudspeaker and the second loudspeaker in the sound generating device to output a sound signal based on the audio signal if the first control signal is received, and configured to control the first loudspeaker to output a sound signal based on the audio signal and control the second loudspeaker not to operate if the second control signal is received.

11. A control apparatus for a sound generating device according to claim 2, and the control apparatus comprises:

a trigger module configured to generate a trigger signal if it is activated;

a control module configured to control an output of an audio signal, and also configured to generate a first control signal if the trigger signal is received and generate a second control signal if no trigger signal is received;

an adjustment module configured to control the first loudspeaker and the second loudspeaker in the sound generating device to output a sound signal based on the audio signal if the first control signal is received, and configured to control the first loudspeaker to output a sound signal based on the audio signal and control the second loudspeaker not to operate if the second control signal is received.

12. A playing device, comprising:

a sound generating device according to claim 1; and a control apparatus for the sound generating device, wherein the control apparatus comprises:

a trigger module configured to generate a trigger signal if it is activated;

a control module configured to control an output of an audio signal, and also configured to generate a first control signal if the trigger signal is received and generate a second control signal if no trigger signal is received;

an adjustment module configured to control the first loudspeaker and the second loudspeaker in the sound generating device to output a sound signal based on the audio signal if the first control signal is received, and configured to control the first loudspeaker to output a sound signal based on the audio signal and control the second loudspeaker not to operate if the second control signal is received, wherein only one second loudspeaker is provided, and the adjustment module controls the first loudspeaker and the second loudspeaker in the sound generating device to output the sound signal based on the audio signal if the first control signal is received.

13. A playing device, comprising:

a sound generating device according to claim 1; and a control apparatus for the sound generating device, wherein the control apparatus comprises:

a trigger module configured to generate a trigger signal if it is activated;

a control module configured to control an output of an audio signal, and also configured to generate a first control signal if the trigger signal is received and generate a second control signal if no trigger signal is received;

an adjustment module configured to control the first loudspeaker and the second loudspeaker in the sound generating device to output a sound signal based on the audio signal if the first control signal is received, and configured to control the first loudspeaker to output a sound signal based on the audio signal and control the second loudspeaker not to operate if the second control signal is received, wherein a plurality of second loudspeakers are provided, and the adjustment module controls the first loudspeaker and one or more of the second loudspeakers in the sound generating device to output the sound signal based on the audio signal if the first control signal is received.

14. The playing device of claim 13, wherein the adjustment module further comprises:

a first switch provided between the first power amplification module and a power supply module, and configured to turned on if the first control signal or the second control signal is received; and a second switch provided between the second power amplification module and the power module, and configured to turned on if the first control signal is received and turned off if no first control signal is received.

15. The playing device of claim 13, wherein the adjustment module comprises a filtering compensation module configured to adjust a gain value and a phase value of each frequency band of the audio signal, and wherein the filtering compensation module is a DSP.

16. A playing device, comprising:

a sound generating device according to claim 1; and a control apparatus for the sound generating device, wherein the control apparatus comprises:

a trigger module configured to generate a trigger signal if it is activated;

a control module configured to control an output of an audio signal, and also configured to generate a first control signal if the trigger signal is received and generate a second control signal if no trigger signal is received;

an adjustment module configured to control the first loudspeaker and the second loudspeaker in the sound generating device to output a sound signal based on the audio signal if the first control signal is received, and configured to control the first loudspeaker to output a sound signal based on the audio signal and control the second loudspeaker not to operate if the second control signal is received, wherein the trigger module is one or more of a pressure sensor, a toggle switch and a noise sensor.

17. A playing device, comprising:

a sound generating device according to claim 1; and a control apparatus for the sound generating device, wherein the control apparatus comprises:

a trigger module configured to generate a trigger signal if it is activated;

a control module configured to control an output of an audio signal, and also configured to generate a first control signal if the trigger signal is received and generate a second control signal if no trigger signal is received;

an adjustment module configured to control the first loudspeaker and the second loudspeaker in the sound generating device to output a sound signal based on the audio signal if the first control signal is received, and configured to control the first loudspeaker to output a sound signal based on the audio signal and control the second loudspeaker not to operate if the second control signal is received, wherein the adjustment module comprises:

a filtering compensation module configured to adjust a gain value and a phase value of each frequency band of the audio signal;

a first power amplification module connected with the first loudspeaker, wherein the first power amplification module is configured to adjust the gain value of each frequency band of the audio signal according to the received first control signal or the received second control signal, so that the first loudspeaker outputs a first sound signal or a second sound signal; and a second power amplification module connected with the second loudspeaker, wherein the second power amplification module is configured to adjust the gain value of each frequency band of the audio signal, so that the second loudspeaker outputs a third sound signal.

18. A playing device, comprising:

a sound generating device according to claim 2; and a control apparatus for the sound generating device, wherein the control apparatus comprises:

a trigger module configured to generate a trigger signal if it is activated;

a control module configured to control an output of an audio signal, and also configured to generate a first control signal if the trigger signal is received and generate a second control signal if no trigger signal is received;

an adjustment module configured to control the first loudspeaker and the second loudspeaker in the sound generating device to output a sound signal based on the audio signal if the first control signal is received, and configured to control the first loudspeaker to output a sound signal based on the audio signal and control the second loudspeaker not to operate if the second control signal is received.

19. The sound generating device of claim 1, wherein the rear cavity of the first loudspeaker and the front cavity of the second loudspeaker are coupled at the rear sound outlet.

* * * * *